United States Patent [19]

Rossmann et al.

[11] Patent Number: 4,927,336

[45] Date of Patent: May 22, 1990

[54] DRIVE SYSTEM INCLUDING AN ENGINE AND A TURBO-CHARGER

[75] Inventors: Axel Rossmann; Werner Huether, both of Karlsfeld, Fed. Rep. of Germany

[73] Assignee: MTU Motoren-Und Turbinen-Union Muenchen GmbH, Munich, Fed. Rep. of Germany

[21] Appl. No.: 129,703

[22] Filed: Dec. 7, 1987

[30] Foreign Application Priority Data

Dec. 10, 1986 [DE] Fed. Rep. of Germany ....... 3642121

[51] Int. Cl.$^5$ .............................................. F04B 17/00
[52] U.S. Cl. .................................... 417/407; 60/605.3
[58] Field of Search ............... 417/405, 406, 407, 408, 417/409; 60/605.1, 605.3; 123/41.31

[56] References Cited

U.S. PATENT DOCUMENTS 2,646,210 7/1953 Kohlmann et al. .
2,933,044 4/1960 Williams .............................. 417/407
4,107,927 8/1978 Gordon, Jr. et al. ............... 417/407
4,147,467 4/1979 Leicht et al. ......................... 417/407
4,704,075 11/1987 Johnston et al. .................... 417/407

FOREIGN PATENT DOCUMENTS 8311308 8/1983 Fed. Rep. of Germany .
3213378 10/1983 Fed. Rep. of Germany .
56-44426 6/1981 Japan .
178828 10/1983 Japan .................................. 417/407

Primary Examiner—Leonard E. Smith
Assistant Examiner—Timothy S. Thorpe
Attorney, Agent, or Firm—W. G. Fasse; D. H. Kane, Jr.

[57] ABSTRACT

A drive system with a combustion engine also has a turbo-charger with a shaft supported by sleeve bearings in a housing. The housing is connected to the cooling water circulating circuit of the drive system for cooling the sleeve bearings and the housing of the turbo-charger shaft simultaneously with cooling the engine. A water pump wheel is mounted on the shaft in the housing for circulating the cooling water through the bearings, through the housing, and through the cooling circuit of the combustion engine, whereby the supply of cooling water to the sleeve bearings is load dependent.

12 Claims, 2 Drawing Sheets

DRIVE SYSTEM INCLUDING AN ENGINE AND A TURBO-CHARGER

OF THE INVENTION

The invention relates to a drive system including a combustion engine and a turbo-charger especially an exhaust gas turbo-charger coupled to the combustion engine of the drive system.

DESCRIPTION OF THE PRIOR ART

It is known to provide exhaust gas turbo-chargers with slide or sleeve bearings and such slide bearings are lubricated with oil from the lubricating oil circulating circuit of the combustion engine. Due to the fact that the temperature in the exhaust gas turbo-charger is high, especially in the turbine section of the turbo-charger, the conventional lubrication of the sleeve bearings has the disadvantage that the lubricating oil must be capable of retaining its lubricating ability even at these high exhaust gas discharge temperatures. In this respect problems have been encountered, especially with the sleeve bearing next to the turbine section of the turbo-charger. Due to the high temperature of the lubricating oil in the sleeve bearing next to the turbine section, it is necessary to provide conventionally an oil cooler which is larger than a respective oil cooler for a piston engine without the turbo-charger. Nevertheless less, a more rapid deterioration of the lubricating oil is encountered and the oil consumption is increased.

It is even possible that a substantial overheating of the turbine bearing of the turbo-charger causes coking with the result that the lubricating oil is rapidly contaminated resulting in damage to engine components which depend for their proper operation on a cooling oil circulating circuit which circulates clean cooling oil. Especially after the engine shut-down there is a danger of damage to the turbo-charger bearings which is especially pronounced for the sleeve bearing on the turbine side and coke formation also takes place because the turbine which is still hot, can overheat the bearing when the flow of cooling oil has stopped with the shut-down of the engine.

It is also known to cool the housing portions of the turbo-charger near the turbine with cooling water from the engine cooling water circulating circuit in an effort to prevent an overheating of the sleeve bearing on the turbine side of the turbo-charger. This type of cooling of the turbine housing portion of the turbo-charger is not very efficient and additionally, it is technically involved and expensive because the cooling oil circulating circuit and the cooling water circulating circuit of the combustion engine must be extended to flow through the exhaust gas turbo-charger.

It is generally known to lubricate sleeve bearings with water rather than with oil when these sleeve bearings are used, for example, in pumps that are working in the vicinity of water or even under water, or which are used for pumping water. In such a situation, the use of a lubricating medium other than water would cause sealing problems between the lubricating medium and the water. Similarly, in connection with sleeve bearings used in drive systems with combustion engines, such sleeve bearings have always been lubricated by oil for an analogous reason, namely to reduce sealing problems.

OBJECTS OF THE INVENTION

In view of the foregoing it is the aim of the invention to achieve the following objects singly or in combination:

to improve a turbo-charger, especially an exhaust gas turbo-charger of a combustion engine drive system, in such a manner that an effective lubrication and an effective cooling is achieved simultaneously for the turbo-charger and for the combustion engine by structurally simple and inexpensive means;

to avoid the problems of the prior art, especially the coking problem;

to use ceramic materials for the sleeve bearings; and to integrate the cooling system of the exhaust gas turbo-charger of a drive system with the cooling water circulating circuit of the combustion engine of the drive system.

SUMMARY OF THE INVENTION

According to the invention a drive system with a combustion engine also as an exhaust gas turbo-charger equipped with water lubricated sleeve bearings. Preferably, the water supply for the turbo-charger sleeve bearings is connected to the cooling water circulating circuit of the combustion engine of the drive system.

The invention achieves substantial structural simplifications. The involved oil supply to the bearings of the turbo-charger is completely avoided. The water supply is used simultaneously for the bearing lubrication and for the cooling, not only of the bearings, but of the entire turbo-charger and of the combustion engine.

The use of water instead of oil as a lubricating medium has the advantage that substantially smaller frictional forces are involved in the bearings because the water has a smaller viscosity than the oil. This feature is especially advantageous in exhaust gas turbo-chargers running at high r.p.m.s. Further, the pressure of the lubricating water is sufficiently high to avoid the formation of steam bubbles.

The use of ceramic materials according to the invention for the sleeve or slide bearings has the advantage that these materials are corrosion resistant even under water and have simultaneously good slide characteristics. It may be sufficient under certain circumstances to make the stationary components of the sleeve bearings of ceramic materials. However, the stationary and the rotating components of the sleeve bearings may be made of ceramic materials or only the rotating components may be made of such materials. In the latter instance, the shaft ends extending into the sleeves of the bearing may carry a ceramic bushing that rotates with the shaft or the ceramic material may be applied to the shaft ends by a spraying operation.

The arrangement of a pump wheel on the turbo-charger shaft for circulating the entire cooling water of the system has the advantage that a separate cooling water circulating pump for the engine is obviated and that it is highly desirable to circulate the cooling water in accordance with the instantaneously prevailing load conditions. This is achieved by driving the pump wheel by the turbo-charger shaft.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
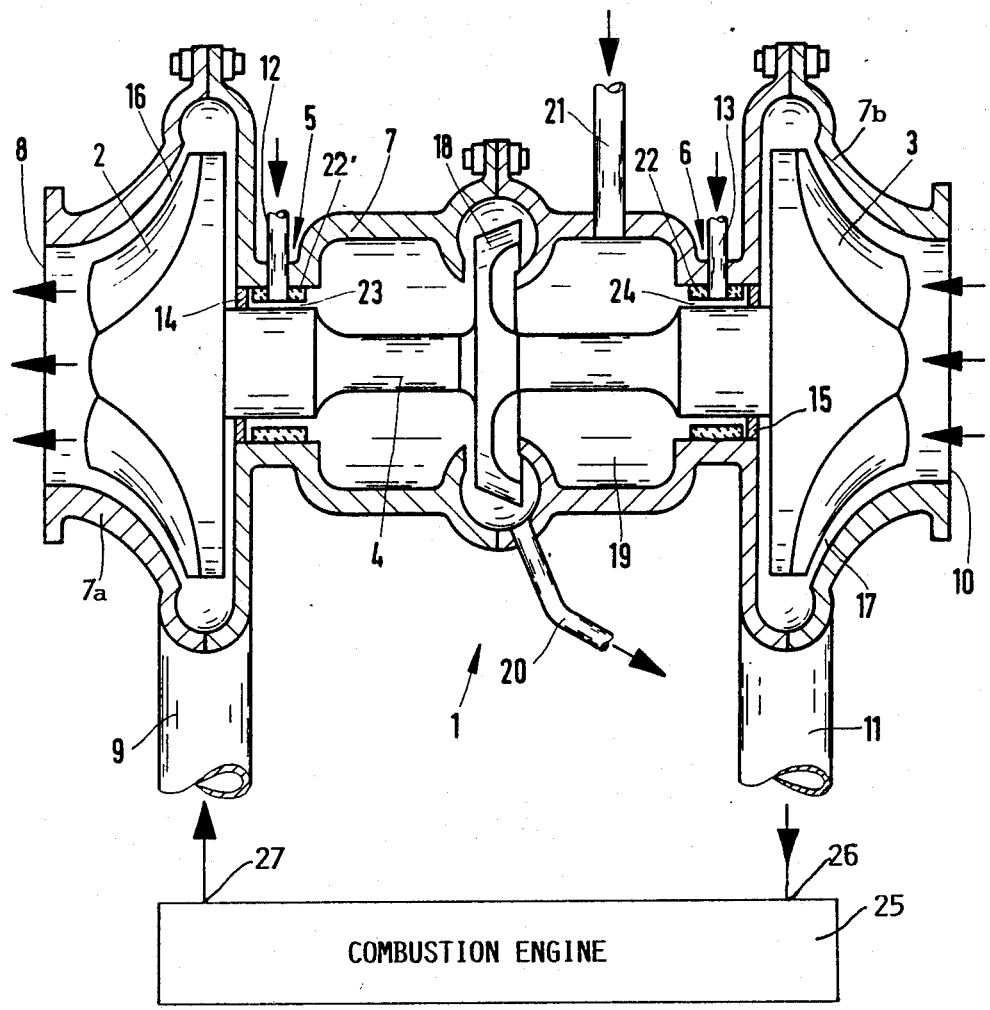
FIG. 1 is a sectional view through a turbo-charger according to the invention.

FIG. 1 shows an exhaust gas turbo-charger 1 illustrated in a partial axial section and connected to a combustion engine 25 having a fresh combustion air inlet 26 and an exhaust gas outlet 27. A radial turbine 2 in a housing section 7a of the housing 7 is connected to the exhaust gas outlet 27 through an exhaust gas pipe 9. Thus, exhaust gases are discharged through the space 16 inside the turbine housing section 7a and through the turbine exhaust port 8. Fresh air passes into an inlet port 10 of a compressor housing section 7b housing a radial compressor 3 for passing fresh air through the compressor space 17 and through a combustion air conduit or pipe 11 into the combustion air inlet port 26 of the engine 25.

Both, the radial turbine 2 and the radial compressor 3 are mounted on a common shaft 4 which in turn is supported in the housing 7 by sleeve bearings 5 and 6. A cooling and lubricating water supply pipe 12 is connected through the housing 7 directly into the sleeve bearing 5. Similarly, a cooling and lubricating water supply pipe 13 is connected through the housing 7 directly into the sleeve bearing 6. These pipes 12 and 13 are connected to the cooling water circulating circuit of the engine 25. The cooling water passes through the bearing and the respective bearing gap 23, 24 into the housing 7. Slide ring seals 14 and 15 keep the water in the housing 7 and out of the turbine space 16 as well as out of the compressor space 17.

A water pumping wheel 18 is rigidly mounted on the common shaft 4 in the space 19 of the housing 7 for pumping cooling water out of the space 19 through a conduit 20 into the cooling water circulating system of the engine 25. Additional cooling water may be supplied through an inlet pipe 21 connected to the housing 7 and to the cooling water circulating system of the engine. Thus, the bearings 5 and 6 as well as the housing 7 are efficiently cooled while the bearings are simultaneously lubricated by the same water.

The bearing 5 has a bearing sleeve 22' and the bearing 6 has a bearing sleeve 22, both of which are preferably made of ceramic material, for example, non-oxidic ceramics such as silicon carbide (SiC) or silicon nitride ($Si_3N_4$). Other suitable ceramic materials are completely or partially stabilized oxidic ceramics such as aluminum oxide ($Al_2O_3$) or zirconium oxide ($ZrO_2$) or any combination of these materials.

Figure 2:
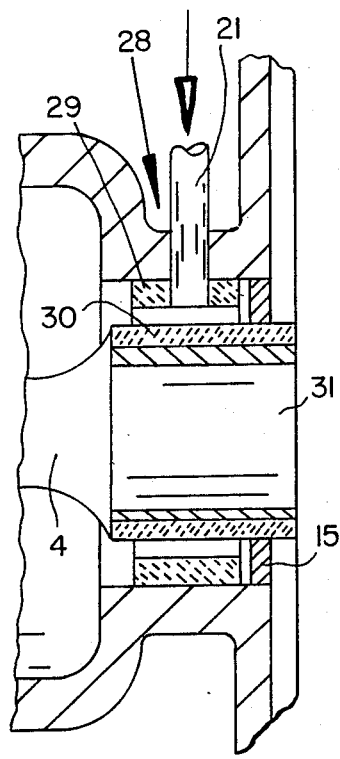
FIG. 2 is an enlarged view of one sleeve bearing with a ceramic stationary sleeve and a ceramic bushing on the shaft end.

FIG. 2 shows a bearing 28 in which the stationary bearing sleeve 29 and a rotating bearing bushing 30 are both made of ceramic materials. The bushing 30 is secured to the end 31 of the shaft 4 to rotate with the shaft.

Figure 3:
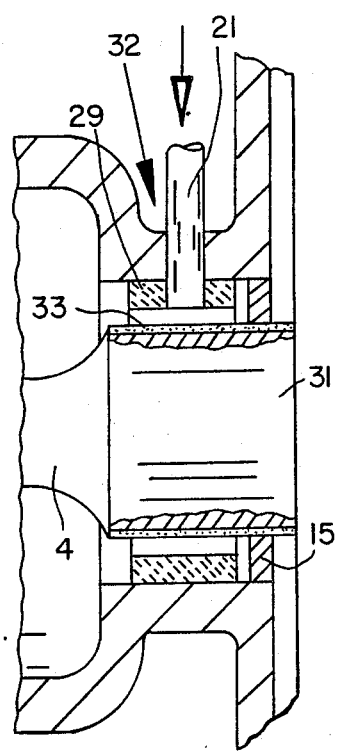
FIG. 3 is a view similar to that of FIG. 2 with a ceramic coating on the shaft end.

FIG. 3 shows a bearing 32 in which the bearing sleeve 29 is the same as in FIG. 2. However, the shaft end 31 in FIG. 3 is provided with a ceramic coating 33 rather than with a ceramic bushing. The ceramic coating may be applied, for example, by a spraying procedure.

Although the invention has been described with reference to specific example embodiments, it will be appreciated, that it is intended to cover all modifications and equivalents within the scope of the appended claims.

What is claimed is:

1. A drive system comprising a combustion engine, a cooling water circulating circuit for said combustion engine, a turbo-charger for said combustion engine, said turbo-charger including a compressor section, a turbine section, and housing means for said turbine section and for said compressor section, a shaft in said housing means for interconnecting said compressor section and said turbine section, sleeve bearing means for supporting said shaft in said housing means, water supply means interconnecting said housing means and said cooling water circulating circuit of said combustion engine for supplying cooling water as a lubricant to said sleeve bearing means, cooling water discharge means connecting said housing means back to said cooling water circulating circuit of said combustion engine for removing water from said housing means, a water pump wheel mounted on said shaft in said housing means between said compressor section and said turbine section for simultaneously circulating cooling water through said cooling water supply means, through said housing means, through said sleeve bearing means, through said cooling water discharge means and through said cooling water circulating circuit of said combustion engine, thereby avoiding a separate cooling pump for said combustion engine.

2. The drive system of claim 1, wherein said sleeve bearing means comprise sleeve bearing members made of ceramic material.

3. The drive system of claim 2, wherein said sleeve bearing members are stationary bearing sleeves of ceramic material mounted in said housing means for supporting said shaft.

4. The drive system of claim 2, wherein said sleeve bearing members are bearing ring layers of ceramic material spray coated on ends of said shaft for rotation with said shaft.

5. The drive system of claim 2, wherein said ceramic material is a non-oxidic ceramic material.

6. The drive system of claim 5, wherein said non-oxidic ceramic material is silicon carbide.

7. The drive system of claim 5, wherein said non-oxidic ceramic material is silicon nitride.

8. The drive system of claim 2, wherein said ceramic material is aluminum oxide.

9. The drive system of claim 2, wherein said ceramic material is zirconium oxide.

10. The drive system of claim 2, wherein said ceramic material is a combination of ceramic materials selected from the group consisting of silicon carbide, silicon nitride, aluminum oxide, and zirconium oxide.

11. The drive system of claim 1, further comprising sealing ring means between said shaft and said housing means for preventing leakage of cooling water to said turbine section and to said compressor section.

12. The drive system of claim 1, wherein said combustion engine includes a combustion air intake and an exhaust gas outlet, first supply pipe means connecting said compressor section to said combustion air intake and second exhaust gas discharge pipe means connecting said turbine section to said exhaust gas outlet.

* * * * *